Jan. 12, 1960

D. A. WASMER
BOOSTER DEVICE 2,920,452

Filed Sept. 8, 1953

INVENTOR.
DARWIN A. WASMER.
BY
*Whittemore Hulbert & Belknap.*
ATTORNEYS

Jan. 12, 1960  D. A. WASMER  2,920,452
BOOSTER DEVICE
Filed Sept. 8, 1953  4 Sheets-Sheet 4

INVENTOR.
DARWIN A. WASMER.

BY

ATTORNEYS

United States Patent Office

2,920,452
Patented Jan. 12, 1960

2,920,452
BOOSTER DEVICE

Darwin A. Wasmer, Detroit, Mich., assignor to Kelsey-Hayes Company, a corporation of Delaware Application September 8, 1953, Serial No. 378,870

7 Claims. (Cl. 60—54.6)

The invention relates to booster devices for hydraulic systems and refers more particularly to booster devices for hydraulic brake systems of automotive vehicles in which the master cylinder is incorporated with the booster to form a booster unit and the booster unit is brought into operation by the actuation of a manually operable element, such as a foot pedal.

The invention has for one of its objects to provide an improved booster device which is constructed to gradually increase the pressure required to initially operate the power piston and thereby make the booster device smooth acting in operation.

The invention has for other objects to provide an improved booster device which is constructed with an air inlet passage and an air valve element which in the inoperative or off position seals the air inlet passage; and to provide an improved booster device which is so constructed that the pressure of liquid created in the master cylinder reacts upon the air valve element thereby imparting feel to the manually operable element for operating the air valve element.

The invention has for a further object to provide an improved booster device in which a reaction rod device abutting the air valve element and a reaction piston abutting the reaction rod device and subject to the hydraulic pressure in the master cylinder transmit the hydraulic pressure to the air valve element and the booster device is constructed to subject the end of the reaction piston abutting the reaction rod device to vacuum in the inoperative or off position of the parts to hold the reaction piston against the reaction rod device.

These and other objects of the invention will become apparent from the description taken in connection with the accompanying drawings in which—

Figure 2 is a cross section on the line 2—2 of Figure 1;

Figure 1:
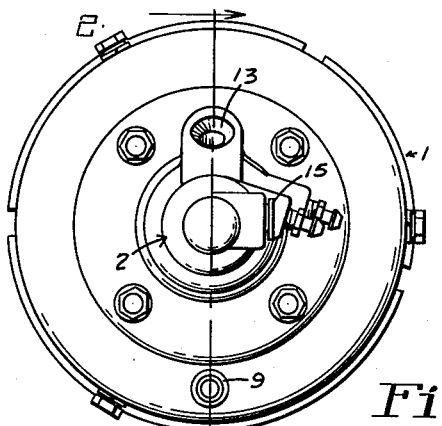
Figure 1 is a front end view of a booster device embodying the invention.

As illustrated in the drawings, the booster device comprises the booster 1, the hydraulic or master cylinder 2, and the manually operable actuating rod 3. The booster has the casing 4 formed with the cylindrical side wall 5, the integral end wall 6 at its front end and the closure 7 at its rear end, there being a suitable seal 8 between the closure and side wall. The end wall 6 is provided with a vacuum port 9 which is adapted to be connected to a suitable source of vacuum, such as the intake manifold 10 of an internal combustion engine of an automotive vehicle. A conventional check valve 11 in the line between the vacuum port and intake manifold permits flow of air to the intake manifold but prevents flow of air in the reverse direction. The booster also has the power piston 12 reciprocable within the cylindrical side wall 5 and cooperating with the casing 4 to define the vacuum and variable pressure chamber 4' and 4² respectively at the front and rear sides of the power piston. The master cylinder 2 is secured to the front end wall 6 of the casing and has the braking liquid inlet port 13 near its rear end, adapted to be connected to a braking liquid reservoir 14, and the braking liquid outlet port 15 near its front end, adapted to be connected to a hydraulic motor 16 such as a wheel cylinder for operating a brake of the automotive vehicle. A suitable seal 17 is provided between the master cylinder and end wall. The actuating rod 3 extends axially and rearwardly of the booster and is adapted to be connected to a manually operable element 18, such as a foot pedal.

The power piston is guided by the axially aligned tubular power plunger 19 and tubular stem 20, the power plunger slidably engaging the bearing 21 at the rear end of the cylinder 2 and the stem slidably engaging the bearing 22 in the closure 7. Suitable seals 23 and 24 respectively between the power plunger 19 and the nut 25 at the rear end of the cylinder and between the stem 20 and the closure 7 are provided. The bearing 21 has the braking liquid inlet port 26 registering with the port 13. The power plunger 19 is secured to and extends forwardly from the power piston 12 at its inner periphery through the bearing 21 and the seal 27 at the front side of the bearing 21 into the cylinder 2 and has near its front end the port 28 which in the retracted position of the power plunger registers with the port 26 and in the operative position is located forwardly of this port so that communication of the cylinder 2 with the reservoir 14 is cut off. The stem 20 is integral with and extends rearwardly from the power piston 12 at its inner periphery.

The power piston 12 comprises the front and rear sections 29 and 30 respectively secured to each other intermediate their inner and outer peripheries, the front section having a rearwardly extending annular boss 31 abutting and secured to the rear section with a suitable sealing ring 32 therebetween. The rear section has at its outer periphery the channel 33 which clamps the radial flange of the angle-shaped sealing ring 34 against the front section, the sealing ring having a peripheral annular flange slidably engaging the side wall 5. The channel also receives suitable lubricating wicking 35 pressing against the annular flange of the sealing ring. The portions of the sections between the boss 31 and channel 33 are axially spaced from each other. The power piston has a central valve chamber which is formed by providing the front section 29 with the reduced chamber portion 36 and the enlarged chamber portion 37 and by providing the rear section 30 with the annular chamber portion 38. The reduced chamber portion 36 is formed by the generally cylindrical side wall 39 and the integral end wall 40 at the front end of the side wall. The enlarged chamber portion 37 is in rear of and opens into the reduced chamber portion and is bounded or enclosed by the annular boss 31. The annular chamber portion 38 is formed by the annular flange 41 at the inner periphery of the rear section, the radial wall portion 42 and the cylindrical wall portion 43 part of which telescopes within the annular boss 31. The annular flange 41 extends forwardly from the radial wall portion 42 and has the air inlet passage 44 in communication with the interior of the stem 20.

The front section 29 is provided with the axially extending vacuum passages 45 radially outwardly of the side wall 39 placing the enlarged chamber portion 37 in communication with the interior of the casing 4 at the front side of the power piston 12, and is also provided with the generally radially extending air passages 46 leading from the reduced chamber portion 36 to the space between the front and rear sections radially outwardly of the annular boss 31. The rear section 30 is provided with the axially extending air passages 47 radially outwardly of the annular chamber portion 38 and communicating with the space between the front and rear sections radially outwardly of the annular boss 31. These air passages and space cooperate with the air passages 46 to place the reduced chamber portion 36 in communication with the interior of the casing 4 at the rear side of the power piston 12.

The valve mechanism for controlling the operation of the booster comprises the vacuum valve element 48, the air valve element 49 and the annular floating seal 50 engageable with the vacuum and air valve elements. The vacuum valve element 48 is formed by an annular rib extending rearwardly from the side wall 39 into the enlarged chamber portion 37 and adapted to make sealing contact with the floating seal. The air valve element is a cup-shaped piston extending within the reduced chamber portion 36 and having the side wall 51, the end wall 52 near the rear end of the side wall and the rearwardly extending annular flange or hub 53 of smaller diameter. The front and rear end portions of the side wall 51 are enlarged and slidably engage the side wall 39, there being an O-ring seal 54 between the front end portion and side wall and the rear end portion having axial grooves 55 providing air passages between the rear end portion and side wall. The end wall 52 has the annular rearwardly extending rib 56 immediately adjacent the grooves 55 adapted to make sealing contact with the floating seal. The floating seal 50 is preferably formed of rubber and is mounted on the radial flange of the ring 57 of angle cross-section. A flexible diaphragm 58 is secured at its outer edge to the axial flange of the ring and at its inner edge to the annular flange 41, the diaphragm serving to seal the portion of the annular chamber portion 38 rearwardly of the diaphragm from direct communication with the air inlet passage 44. The annular seal 50 is axially urged forwardly toward the vacuum valve element 48 and air valve element 49 by means of the coil spring 59 abutting the wall portion 42 of the annular chamber portion 38 and a peripheral flange of the cup-shaped member 60 encircling and abutting the rear side of the diaphragm 58.

The actuating rod 3 has its front end located inside the annular flange or hub 53 and abutting the sound deadening disc 61 which abuts the end wall 52 of the air valve element 49. The actuating rod extends rearwardly within the annular flange 41 and tubular stem 20 and beyond the latter and is of smaller diameter so that air may freely pass through the stem and flange to the air inlet passage 44. This air is filtered by the filter 62 between the cover 63 and closure 7, the air after passing through the filter passing through the space between the stem 20 and the boot 64 into the stem.

To transmit hydraulic pressure created within the master cylinder 2 to the actuating rod 3, hydraulic pressure reaction means is provided. This reaction means comprises the reaction piston 65 and the reaction rod device 66, which is formed of the cup-shaped reaction member 67 and the reaction rod 68. The reaction piston 65 is located within and slidably engages the forward end portion of the power plunger 19 and is exposed to the pressure of the braking liquid in the master cylinder. The sealing ring 69 and the O-ring 69' seal the joint between the piston and power plunger. The cup-shaped reaction member 67 is located within the reduced chamber portion 36 and extends within the air valve element 49 and has its bottom wall engageable with the sound deadening disc 70 upon the end wall 40 and its side wall extending rearwardly from its bottom wall. The reaction rod 68 has the reduced rear end portion 71 extending through the bottom wall of the cup-shaped reaction member 67 and the annular shoulder 72 abutting the front side of the bottom wall. The reaction rod 68 extends freely within the hub 73 and power plunger 19 to provide a clearance space therebetween. The hub provides the connection between the power plunger and the power piston, the hub being integral with and extending forwardly from the end wall 40 and the power plunger being sleeved over and having a press fit with the hub. The clearance space between the reaction rod and the hub and power plunger communicates with the interior of the cup-shaped reaction member by means of the diametral passage 74 forward of the annular shoulder 72 and the intersecting axial passage 75 extending from the rear end of the reduced portion 71. The reaction piston 65 through the reaction rod 68 is adapted to move the cup-shaped reaction member 67 rearwardly against the end wall 52 of the air valve which in turn transmits the rearward pressure through the sound deadening disc 61 to the actuating rod 3 thereby producing feel upon the foot pedal.

A coil spring 76 extends within the cup-shaped reaction member 67 and abuts its bottom wall and the end wall 52 of the air valve element 49, this coil spring resiliently urging the air valve element rearwardly and the cup-shaped reaction member forwardly. In the present instance, this spring controls the forward force that must be exerted upon the actuating rod 3 to move the air valve element forwardly and start the operation of the booster. Also, this spring resists the rearward movement of the reaction piston 65 and reaction rod device 66 and controls the hydraulic pressure in the master cylinder that must be exerted upon the reaction piston to overcome this spring and move the cup-shaped reaction member 67 rearwardly against the end wall 52 of the air valve element 49.

A coil spring 77 is located between the closed end 6 of the casing 4 and the power piston 12 and a coil spring 77' is located within the master cylinder 2, both springs serving to retract the power piston 12 and the power plunger 19, and the coil spring 77' acting through the cup-shaped member 78 to prevent the reaction piston 65 from moving out of the power plunger.

For the purpose of holding the reaction piston 65 against the front end of the reaction rod 68 when the parts are in off or inoperative position, the side wall 51 of the air valve element is provided with the air port 79. This port is located between the enlarged end portions of the side wall and in the off position of the parts communicates with the interior of the casing 4 at the front side of the power piston 12 through the vacuum passages 45, the enlarged chamber portion 37 and the grooves 55, the floating seal 50 being spaced from the vacuum valve element 48. Also, this port communicates with the interior of the power plunger 19 immediately in rear of the reaction piston 65 through the space inside the air valve 49, the space inside the cup-shaped reaction member 67, the passages 74 and 75 and the clearance space between the reaction rod 68 and the hub 73 and power plunger 19.

Figure 4:
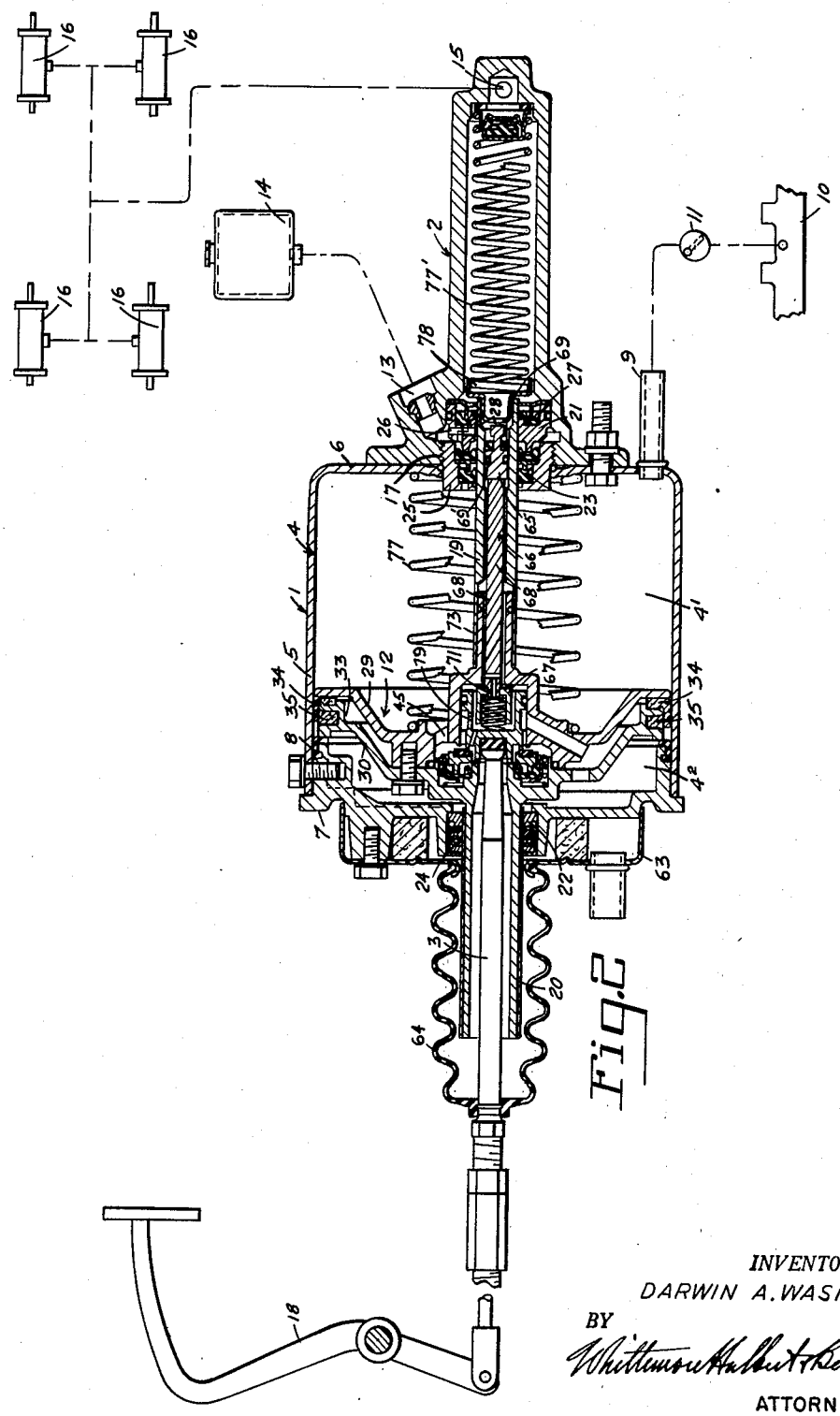
Figures 4, 5 and 6 are views similar to Figure 3 showing the parts in different positions.
Figure 6:
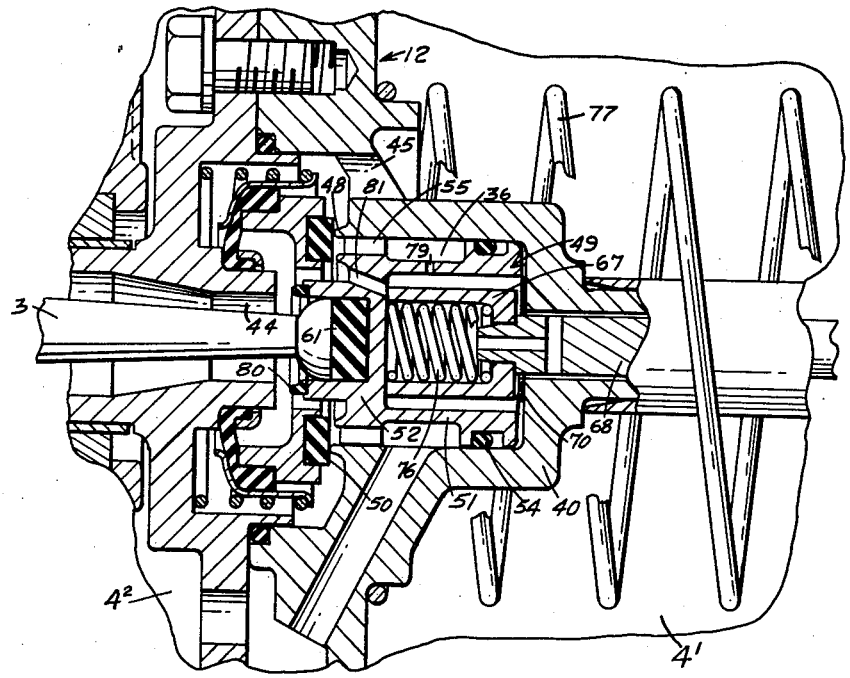
Figure 7:
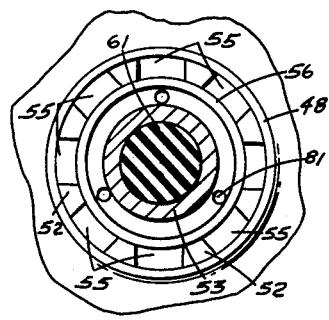
Figure 7 is a cross-section on the line 7—7 of Figure 3.

To gradually increase the pressure required to initially move the power piston forwardly from its off or retracted position, the air port 79 is restricted to meter the air passing therethrough and the air valve element 49 seals the air inlet passage 44 in the off position of the parts and, in addition, its end wall 52 is provided with air passages. In detail, the annular flange or hub 53 of the air valve element has a diameter substantially the same as that of the front end of the annular flange 41 and has secured to its rear end the annular seal 80, preferably formed of rubber, adapted to abut the rear end of the annular flange and seal the air inlet passage 44. Also, the end wall of the air valve element has the generally axially extending air passages 81 between the annular flange or hub 53 and the annular rib 56 leading from the space between the annular flange or hub and the floating seal 50 to the space inside the air valve element. All air passing through the air inlet passage 44 to the reduced chamber portion 36 from the time the air inlet passage is unsealed or open as shown in Figure 4 until the air valve element 49 is moved forwardly out of contact with the floating seal 50 as shown in Figure 6 is metered by the restricted air port 79. As a result, there is gradual flow of air during this interval to the interior of the booster casing at the rear side of the power piston.

Figure 3:
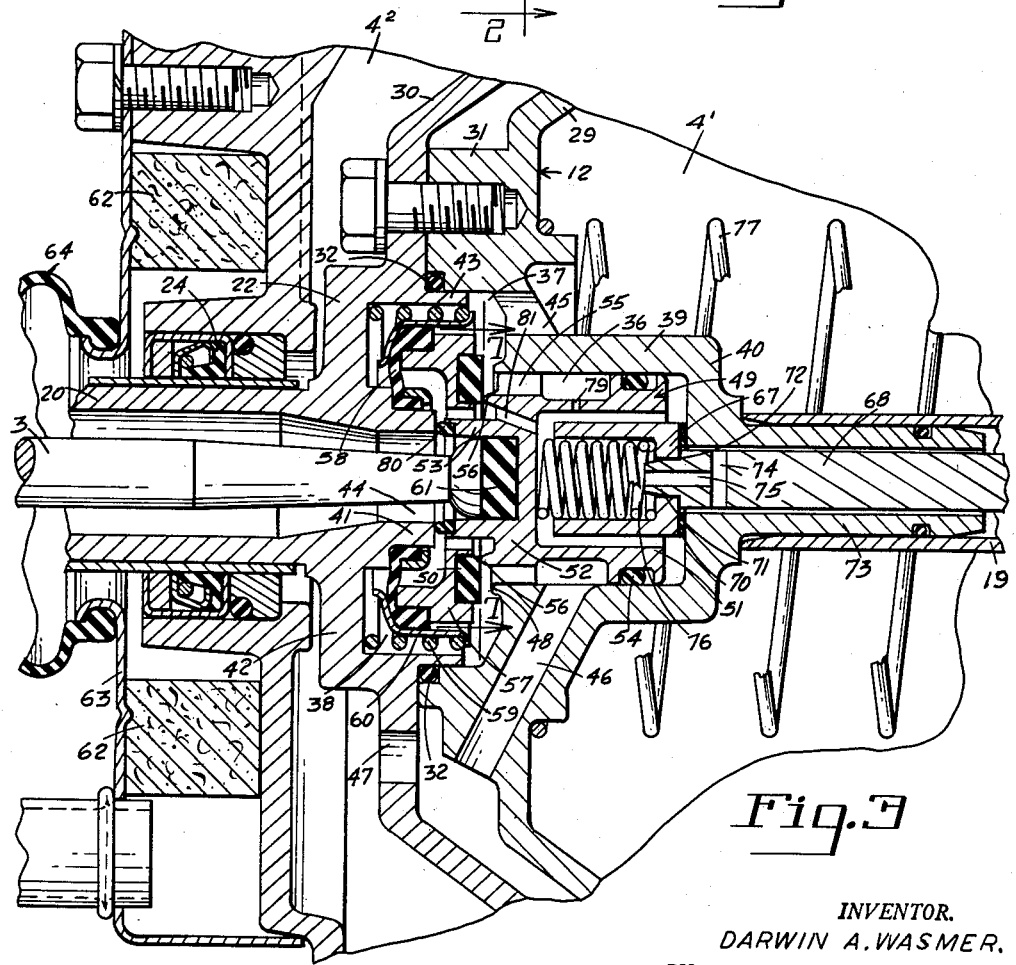
Figure 3 is an enlarged view of a portion of Figure 2.

Assuming the parts to be in the off position, as shown in Figures 2 and 3, and the internal combustion engine of the automotive vehicle running, the air inlet passage 44 is sealed and the interior of the casing 4 at the front side of the power piston 12 is under vacuum and this same pressure is present throughout the entire central chamber of the piston, the interior of the casing 4 at the rear side of the power piston 12 and also the space surrounding the reaction rod 68 so that the rear end of the reaction piston 65 is subject to vacuum holding the rear end against the front end of the reaction rod.

Upon forward movement of the actuating rod 3 against the resistance of the coil spring 76, the actuating rod moves the air valve element 49 forwardly. During the initial portion of this forward movement, the air valve element opens the air inlet passage 44 and the floating seal 50 remains in contact with the air valve, as shown in Figure 4, and air entering through the air inlet passage 44 passes through the passages 81 into the interior of the air valve element and through the restricted metering port 79. Some of the air is withdrawn past the vacuum valve element 48 and through the vacuum passages 45 to the interior of the casing 4 at the front side of the power piston 12 and the remainder of the air passes through the air passages 46 and 47 and the intermediate space between the front and rear sections 29 and 30 of the power piston to the interior of the casing 4 at the rear side of the power piston 12. As a result, there is a gradual flow of air to the interior of the casing at the rear side of the power piston. As the floating seal 50 more closely approaches the vacuum valve element 48, the rate of flow of air to the interior of the casing at the rear side of the power piston 12 increases until the floating seal firmly engages the vacuum valve element. At the instant the vacuum valve element is closed by being engaged by the floating seal 50, the seal is still in engagement with the air valve element, as shown in Figure 5, so that the air entering through the air inlet passage 44 is still gradually passing through the metering port 79 to the interior of the casing at the rear side of the power piston.

Upon continued forward movement of the air valve element 49 by the actuating rod, the air valve element leaves the floating seal 50 which remains against the vacuum valve element 48 so that air entering the air inlet passage 44 may now also pass through the grooves 55 of the air valve element to the interior of the casing at the rear side of the power piston 12 thereby materially increasing the rate of flow of air. By reason of air passing through the metering port 79 and surrounding the rear end portion of the air valve element 49, the movement of the air valve element away from the floating seal is facilitated and may be effected relatively gradually instead of abruptly.

Figure 5:
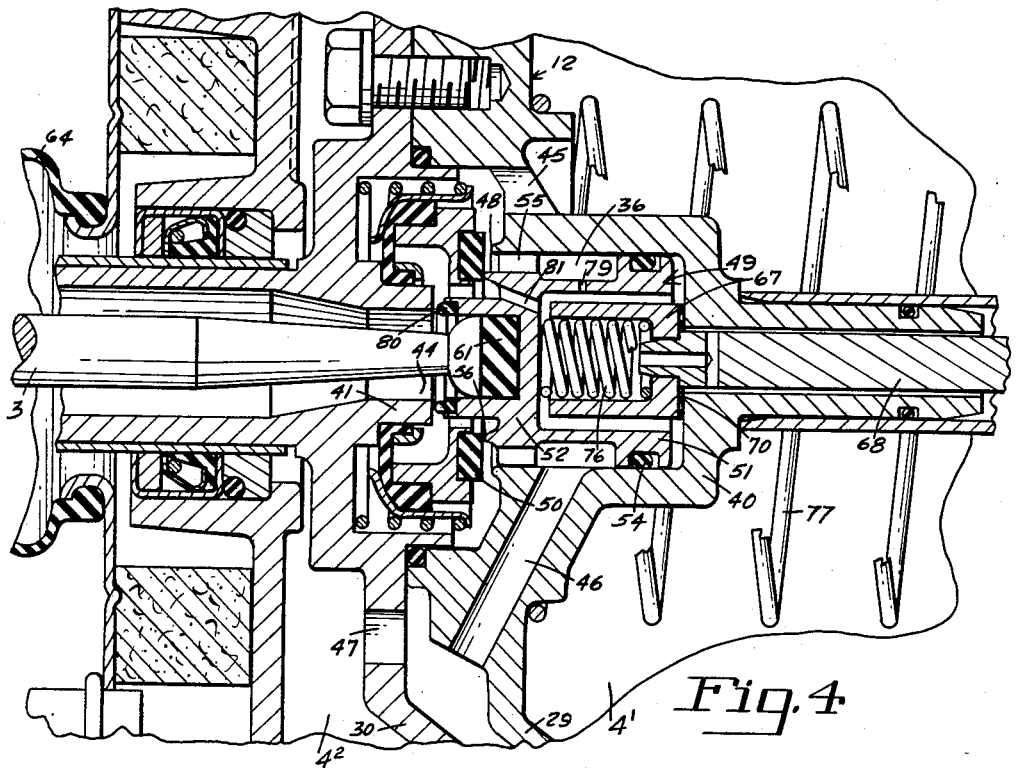

During the interval the air valve element 49 is being moved forwardly by the actuating rod 3 from the position shown in Figure 3 to the position shown in Figure 5, air gradually flows into the interior of the casing in front and rear of the power piston 12 and gradually increases the pressure in rear of the power piston at a materially faster rate than the pressure in front of the power piston increases. During the continued forward movement of the air valve element by the actuating rod from the position shown in Figure 5, air flows at a faster rate into the interior of the casing at the rear only of the power piston 12 and increases the pressure at the rear sufficiently to initiate forward movement of the power piston. During this forward movement, the liquid inlet ports 26 and 13 are cut off after which the power plunger 19 creates hydraulic pressure within the master cylinder 2. When this hydraulic pressure is raised sufficiently to overcome the coil spring 76, the reaction piston 65 acting through the reaction rod 68 and the cup-shaped reaction member 67 moves the end of the side wall of the latter against the end wall 52 of the air valve element 49, as shown in Figure 6, so that the hydraulic pressure within the master cylinder reacts upon the actuating rod 3 to resist its continued forward movement to thereby impart feel to the foot pedal. Upon continued forward movement of the actuating rod maintaining the air valve element spaced forwardly from the floating seal, additional air is allowed to enter the casing 4 in rear of the power piston 12 so that the power piston moves forwardly to increase the hydraulic pressure in the master cylinder until the air pressure in rear of the power piston becomes atmospheric. However, assuming the source of vacuum ceases operating during the forward movement of the actuating rod 3 and air valve 49, the increase in hydraulic pressure can continue until the pressure exerted by the power piston 12 under the differential air pressure on its front and rear sides balances the hydraulic pressure. In the event that the source of vacuum ceases operating after forward movement of the actuating rod 3 and air valve element 49 has been stopped, the hydraulic pressure is maintained but air enters the casing both in front and rear of the power piston 12 destroying the reserve power. With the reserve power destroyed, any further increase in hydraulic pressure can be created manually only by continued forward movement of the actuating rod, which moves the power piston and power plunger and the hydraulic pressure reaction means forwardly by means of air valve element. It is also apparent that the hydraulic pressure can be created manually only in the same manner if the source of vacuum is not operating. If the actuating rod is allowed to return to its off position, the various parts return to their off positions as shown in Figures 2 and 3.

What I claim as my invention is:

1. A booster unit for a hydraulic brake system comprising a casing, a power piston movable forwardly and rearwardly in said casing under the influence of differential air pressure and defining vacuum and variable pressure chambers at the front and rear sides of said power piston, said power piston having a central chamber provided with an air inlet passage, said piston having a rearwardly extending vacuum valve element, said piston having a vacuum passage placing a portion of said chamber at one side of said vacuum valve element in communication with the vacuum chamber, said piston having air passage means placing a portion of said chamber at the other side of said vacuum valve element in communication with the variable pressure chamber, an air valve element axially movable within said last-mentioned chamber portion, an axially movable seal carried by said piston and resiliently urged forwardly for engagement with said vacuum and air valve elements and serving as one element cooperating with said vacuum and air valve elements to form vacuum and air valves, said air valve element having a portion for sealing said air inlet passage, said air valve element having an air passage for conducting air to the front side of said air valve element, said air valve element also having an air metering port opening into the space at the front side of said air valve element and communicating with said vacuum passage and air passage means for controlling the gradual flow of air to the variable pressure chamber during the time said air valve element is being moved forwardly to open said air inlet passage and until said vacuum valve element is engaged by said seal, a power plunger secured to said power piston and manually operable means for moving said air valve element forwardly.

2. A booster device comprising a casing, a power piston movable forwardly in said casing under differential air pressure and defining vacuum and variable pressure chambers at the front and rear sides of said power piston, said power piston being provided with a valve chamber having an air inlet passage and vacuum and air passages between said vacuum and variable pressure chambers respectively and said valve chamber, a power plunger movable by said power piston, valve mechanism within said valve chamber for controlling the passage of air from said air inlet passage to said vacuum and air passages, said valve mechanism comprising a vacuum valve element on said power piston, a relatively movable member provided with an air valve element and a relatively movable seal engageable with said vacuum and air valve elements and movable toward and away from said vacuum valve element, said seal serving as one element cooperating with said vacuum and air valve elements to form vacuum and air valves, said member in the off position of the parts sealing said air inlet passage and being provided with restricted air passage means by-passing said air valve element for the passage of air from said air inlet passage to said vacuum passage and first-mentioned air passage to control the gradual flow of air.

3. A booster device comprising a casing, a hydraulic cylinder at the front end of said casing, a power piston movable forwardly in said casing under differential air pressure and defining vacuum and variable pressure chambers at the front and rear sides of said power piston, said power piston being provided with a valve chamber having an air inlet passage, vacuum and air passages between said vacuum and variable pressure chambers respectively and said valve chamber, a tubular power plunger movable by said power piston into said hydraulic cylinder, a vacuum valve element on said power piston extending into said valve chamber, a relatively movable air valve element in said valve chamber and a relatively movable seal in said valve chamber engageable with such vacuum and air valve elements and movable toward and away from said vacuum valve element, said seal serving as one element cooperating with said vacuum and air valve elements to form vacuum and air valves, a hydraulic pressure reaction means between said air valve element and hydraulic cylinder comprising a reaction rod device movable within said power plunger and operative to move said air valve element rearwardly and a reaction piston abutting the forward end of said reaction rod device and slidable within said power plunger and exposed to the hydraulic pressure within said cylinder, means on said air valve element for sealing said air inlet passage in the off position of the parts and a port in said air valve element communicating with said vacuum passage and the rear end of said reaction piston in the off position of the parts for subjecting the rear end of said reaction piston to vacuum.

4. A hydraulic pressure producing device comprising a casing, a hydraulic cylinder, a pressure responsive power piston in said casing defining vacuum and variable pressure chambers, a pressure transmitting member acted on by said power piston and having a fluid displacing portion in said hydraulic cylinder, a manually operable member controlling the operation of said power piston, a reaction device acted upon by the pressure developed in the hydraulic cylinder for transmitting a porportional reaction force to said manually operable member, said reaction device comprising a reaction piston and a reaction rod, and means carried by said power piston for subjecting said reaction piston to vacuum in the off position of the parts to hold said reaction piston against said reaction rod, said means comprising valve mechanism for controlling the connection of the variable pressure chamber to the vacuum chamber and to air at atmospheric pressure operable to seal said reaction piston from air at atmospheric pressure and to expose said reaction piston to vacuum in the vacuum chamber.

5. A hydraulic pressure producing device comprising a casing, a hydraulic cylinder at the front end of said casing, a pressure responsive power piston in said casing defining vacuum and variable pressure chambers at the front and rear sides of said power piston, a pressure transmitting member acted on by said power piston and having a fluid displacing portion in said hydraulic cylinder, a valve control member reciprocably associated with said power piston, a reaction device having one end operative to act on said valve control member and the other end acted upon by the pressure in said hydraulic cylinder, said reaction device comprising a reaction piston and a reaction rod reciprocably mounted in said pressure transmitting member, and means operable in the off position of the parts for subjecting said reaction piston to vacuum in the vacuum chamber to hold said reaction piston against said reaction rod.

6. A hydraulic pressure producing device comprising a differential air pressure power casing, a pressure responsive power piston in said casing defining vacuum and variable pressure chambers at opposite sides of said piston, an operator operated means including valve means for controlling said power piston, reaction means having a reaction piston and a reaction rod operative to exert a reaction force upon said operator operated means which varies with variations in the force exerted by said power piston, said valve means having means in the off position of the parts sealing said reaction piston from air at atmospheric pressure and exposing said reaction piston to vacuum in said vacuum chamber to hold said reaction piston against said reaction rod.

7. A hydraulic pressure producing device comprising a differential air pressure power casing, a pressure responsive power piston in said casing defining vacuum and variable pressure chambers, and an operator operated valve means for controlling the connection of the variable pressure chamber to the vacuum chamber and to air at atmospheric pressure, said valve means in the off position of the parts sealing the variable pressure chamber from air at atmospheric pressure and being provided with an air valve element for admitting air at atmospheric pressure to said variable pressure chamber upon operation of said valve means, said valve means also being provided with restricted air passage means by-passing said air valve element for the passage of air at atmospheric pressure to said variable pressure chamber upon operation of said valve means and prior to the admission thereto of air at atmospheric pressure by said air valve element.

References Cited in the file of this patent

UNITED STATES PATENTS

| 1,620,513 | Bragg et al. | Mar. 8, 1927 |
| 2,260,491 | Stelzer | Oct. 28, 1941 |
| 2,365,471 | Ingres | Dec. 19, 1944 |
| 2,374,545 | Ingres | Apr. 24, 1945 |
| 2,475,105 | Mitton | July 5, 1949 |
| 2,532,960 | Stelzer | Dec. 5, 1950 |
| 2,685,170 | Price | Aug. 3, 1954 |
| 2,690,740 | Hupp | Oct. 5, 1954 |
| 2,763,989 | Ayers | Sept. 25, 1956 |